United States Patent
Papenhoven

(10) Patent No.: US 8,527,738 B2
(45) Date of Patent: Sep. 3, 2013

(54) FLEXRAY SYSTEM USING EFFICIENT STORAGE OF INSTRUCTIONS

(75) Inventor: Rene Papenhoven, Oosterhout Gem Nijmegen (NL)

(73) Assignee: NXP B.V., Eindhoven (NL)

(*) Notice: Subject to any disclaimer, the term of this patent is extended or adjusted under 35 U.S.C. 154(b) by 493 days.

(21) Appl. No.: 12/742,961

(22) PCT Filed: Oct. 17, 2008

(86) PCT No.: PCT/IB2008/054275
§ 371 (c)(1),
(2), (4) Date: May 14, 2010

(87) PCT Pub. No.: WO2009/063347
PCT Pub. Date: May 22, 2009

(65) Prior Publication Data
US 2010/0268910 A1    Oct. 21, 2010

(30) Foreign Application Priority Data

Nov. 14, 2007 (EP) .................................... 07120646

(51) Int. Cl.
*G06F 12/00* (2006.01)
(52) U.S. Cl.
USPC .......................................... 711/217; 711/201
(58) Field of Classification Search
USPC .......................................... 711/201, 208, 217
See application file for complete search history.

(56) References Cited

U.S. PATENT DOCUMENTS

2004/0064578 A1    4/2004  Boucher et al.
2007/0206603 A1*   9/2007  Weich et al. ............... 370/395.4

FOREIGN PATENT DOCUMENTS

| CN | 1784325 A | 6/2006 |
|---|---|---|
| CN | 1922827 A | 2/2007 |
| WO | 2005/002145 A1 | 1/2005 |
| WO | 2006131879 A2 | 6/2006 |

OTHER PUBLICATIONS

Flexray Consortium; "Flexray Communications System Protocol Specification V2.1, Rev. A"; 245 Pages (Dec. 2005).
Bertoluzzo, Manuele, et al; "Experimental Analysis of a Time-Triggered Network Designed for Train Communications"; 33rd Annaual Conference of the IEEE Industrial Electronics Society; Taipei, Taiwan; pp. 2604-2609; (Nov. 5-8, 2007).
Obermaisser, Roman, et al; "A Simulation Framework for Virtual Integration of Integrated Systems"; EUROCON 2007 The Intl Conference on "Computer As a Tool"; WARSAW 10 Pages (Sep. 9-12, 2007).
Publisher—European Patent Office; Author—F. Knapczyk; Title—Int'l. Search Report for In'tl. Patent Appln. No. PCT/IB2008/054275; Relevant Pages—all (3pgs); Date & Place of Publication—Apr. 7, 2009, Rijswijk, NL.
Publisher—Chinese Patent Office; Author—Xuan Zeng; Title—First Office Action for Chinese Patent Appln. No. 200880115811.9; Relevant Pages—all (3 pgs.) Date & Place of Publication—Aug. 2, 2012, CN.

* cited by examiner

*Primary Examiner* — Reba I Elmore

(57) ABSTRACT

A data processing system comprises multiple data processing nodes that communicate with one another using the FlexRay protocol. Each respective node works according to a respective schedule based on a repetitive sequence of cycles, each cycle having a sequence of time slots. Each node executes instructions, one per time slot, if any. The instructions are stored in a memory. Each instruction is identified by the relevant cycle number and time slot number in the relevant cycle. Accordingly, the combination of cycle number and slot number identify a memory address. Typical instructions appear more than once in the repetitive sequence of cycles for a node. This temporal pattern of occurrences of the same instruction at a node is used to modify the generation of the memory addresses, so that the same memory address is generated each time the instruction is needed. This makes efficient use of storage space.

16 Claims, 4 Drawing Sheets

FLEXRAY SYSTEM USING EFFICIENT STORAGE OF INSTRUCTIONS

FIELD OF THE INVENTION

The invention relates to a data processing system comprising multiple data processing nodes operative to communicate with one another, and to a node for use in such a system. The invention relates in particular, but not exclusively, to a FlexRay environment.

BACKGROUND ART

A time-triggered data processing architecture is a network of embedded data processing nodes interconnected through a bus. The nodes share a common notion of time and execute tasks according to a schedule. A node comprises a data processing unit that receives and/or transmits data via the bus, and possibly also comprises an actuator or a sensor governed by the data processing unit.

An example of such an architecture is a FlexRay system, especially developed for automotive applications. The FlexRay Consortium is an alliance of automotive, semiconductor and electronic systems manufacturers, working together to develop a deterministic and fault-tolerant bus system with high data rates for advanced automotive control applications. NXP (founded by Philips Electronics) is a member of this Consortium.

FIG. 1 is a block diagram of a FlexRay system 100. System 100 comprises a bus 102 that interconnects a plurality of nodes 104, 106, 108, ..., and 110. Each of nodes 104-110 has, e.g., a sensor, an actuator, or a data processing capability. Control data for the actuators, sensor data from the sensors and system level control data for the nodes are communicated via bus 102. Bus 102 has been drawn as comprising channels 112 and 114, but this is merely by way of example. Bus 102 may consist of a single channel or of three or more channels, depending on the application of system 100 in operational use. Two or more communication channels enable to increase the communication bandwidth and/or reliability of the communication. Nodes 104-110 have a uniform configuration as far as data communication via bus 102 is concerned. Node 104 is discussed in further detail as being representative of nodes 104-110. Node 104 comprises a host processor 116, a communication controller 118, and a bus driver 120. Processor 116 supplies data transmitted via bus 102 under control of controller 118, and/or processes data received via bus 102 and controller 118. Driver 120 connects controller 118 to bus 102. Processor 116 or controller 118 further control the time slots during which node 104 has access to bus 102 in the communication protocol used.

At the core of the FlexRay system is the FlexRay communications protocol. The protocol provides flexibility and determinism by combining a scalable static and dynamic message transmission, incorporating the advantages of familiar synchronous and asynchronous protocols.

FIG. 2 is a diagram 200 illustrating some aspects of the FlexRay protocol. The protocol's schedule 202 per node, e.g., node 104, uses the concept of communication slots and communication cycles. The temporal configuration of schedule 202 is considered a concatenation of a plurality of sequences, among which only sequence 204 and sequence 206 have been labeled in FIG. 1 in order to not obscure the drawing. Each sequence is made up of a series of cycles. For example, sequence 204 is made up of a series of cycles, such as cycles 208 and 210. In FlexRay, the number of cycles per sequence is set to 64. Each cycle is made up of a succession of time slots (or: communication slots). FIG. 1 illustrates this for cycle 208 that includes slots 212 and 214. In FlexRay, each cycle consists of up to 2047 slots. A communication slot is the time period allocated to a single communication event per bus channel available to this node. A communication cycle defines a recurring time window. The duration of the cycle is fixed when the network becomes configured. The number of cycles in a sequence of cycles, before the sequence repeats itself, is also fixed when the system becomes configured. The time window, which is defined by the communication cycle, can be divided into a static segment and a dynamic segment. The length of these segments is also defined in the configuration. The purpose of the static segment is to provide a time window for scheduling a number of time-triggered messages. This part of the communication cycle is reserved for the synchronous communication, which guarantees a specified frame latency and jitter through fault-tolerant clock synchronization. The messages which should be transferred in the static segment must be configured before starting the communication, and the maximal amount of the data transferred in the static segment cannot exceed the duration of the static segment. In the dynamic segment of the communication cycle, each node may transfer event-triggered messages.

In a single cycle, multiple slots (2 to 2047 slots, depending on the network configuration) are used for communication among the nodes. A specific slot in a cycle is identified by a specific "SlotID" value in the range 1 to 2047 and the slots become available to the node in the order of their "SlotID" values: A particular cycle is identified by a particular "CycleCount" value in the range 0 to 63. The number of cycles is fixed at 64 (the cycle succeeding cycle 63 will be cycle 0) in this example. As a result, an addressable slot occurring in only a single one of the cycles is repeated after every 64 cycles.

Referring now to FIG. 3, basically all possible combinations of SlotIDs and CycleCounts can be described through a communication-matrix 300. That is, the activity of a node per node-slot and per node-cycle can be mapped on two-dimensional matrix 300 of rows and columns, wherein a specific row identifies a specific slot and wherein a particular column identifies a particular cycle. For a specific node in network 100 each intersection of row and column identifies the associated activity that has been scheduled for the node in that particular slot in that particular cycle. Examples of activities are "Transmit from a specific buffer", "Receive into a specific buffer", "Ignore", etc. The different usage of the same slot in different cycles is known as "slot multiplexing" (variations in Rx and Tx) and "cycle multiplexing" (variations in message buffers). For an example, see FIG. 1.

For a description of an example of a Flexray system see, e.g., US patent application publication 20050254518, herein incorporated by reference.

SUMMARY OF THE INVENTION

The entries used in the matrix need to be stored for retrieval. This can be done by storing the full matrix in memory. For the FlexRay example, SlotID and CycleCount can be used to determine the read address. A major disadvantage of this storage approach is that the memory usage is by far too large for a typical FlexRay controller. Consider the following example: A node uses 100 slots. If each entry of the matrix requires 32-bits the total amount of memory would be 100 slots×64 cycles×4 byte=25 Kbyte. Additional memory space is required to store the messages. As a typical microcontroller has an internal RAM in the range of 16 to 64 Kbyte, the additional memory needed results in extra costs.

An aspect of the invention resides in providing a more efficient storing approach. This aspect is based on the insight that typical activities associated with certain slots repeat themselves at a time scale shorter than once per maximum number of cycles, i.e., once per 64 cycles as in the example discussed above. If a specific activity has a has a higher repetition rate, e.g., every cycle, every 2 cycles, every 4 cycles or every 8 cycles, the storage of the communication matrix data can be optimized by reducing duplicate entries. In other words, the recurrence of activities at different time scales can be used to optimize efficiency of storage.

Accordingly, the inventors propose a data processing system, e.g., a FlexRay system. In an embodiment of the invention, information about an operation that is to be executed more frequently than once per full number of cycles (e.g., periodically), is stored only once at a specific memory address. Note that each operation can be identified based on the identification of the cycle and on the identification of the time slot wherein the operation is to be executed. As the activities per specific slot are repeated after a specific number of cycles that is smaller than the maximum repetition rate (e.g., 64 cycles for FlexRay), the inventors propose to map per slot the current cycleID onto a specific memory address to retrieve the details of the operation to be carried out, using a transformation of the cycleID. The full sequence of cycleIDs for this slot can thus be shortened to a shorter sequence that is repeated over the full sequence. In an embodiment, instead of a full cycle counter one has a modulo cycle counter. Note that a pattern of periodicity is one example of a scenario wherein an operation occurs more frequently than once every full number of cycles. Temporal patterns with recurrent operations other than on a pure periodic basis can be taken care of as well, using more intricate transformations. Examples thereof are discussed further below. In an embodiment, the address generating means is shared by all nodes. Alternatively, the address generating means comprises individual address generator means per individual node.

In another embodiment, the specific operation is carried out in the current time slot. This implies that the relevant specific transformation for the specific operation is to be determined first, before the memory address can be determined to retrieve from the memory the associated information (e.g., instruction code, or parameter values, etc.) needed to execute the specific operation. This could be done by, e.g., reading from the memory or from another memory the transformation specifics first, at an address determined by the identifications of the current time slot and the current cycle, and then using these transformation specifics to determine the address of the operation to be executed.

In another embodiment, the specific operation is executed in a later time slot, e.g., the one succeeding the current time slot. This then enables to prepare the system in a time slot for operations in the later time slots. In yet another embodiment, the memory is now organized in such a manner that further information about the transformation (the specifics of the transformation to be applied) is stored at another memory address determined by the identity of another time slot preceding the current time slot. The specifics are then retrieved and stored in a register so as to be available for determining the next memory address.

BRIEF DESCRIPTION OF THE DRAWING

The invention is explained in further detail, by way of example and with reference to the accompanying drawing, wherein.

Throughout the Figures, similar or corresponding features are indicated by same reference numerals.

DETAILED EMBODIMENTS

Figure 1:
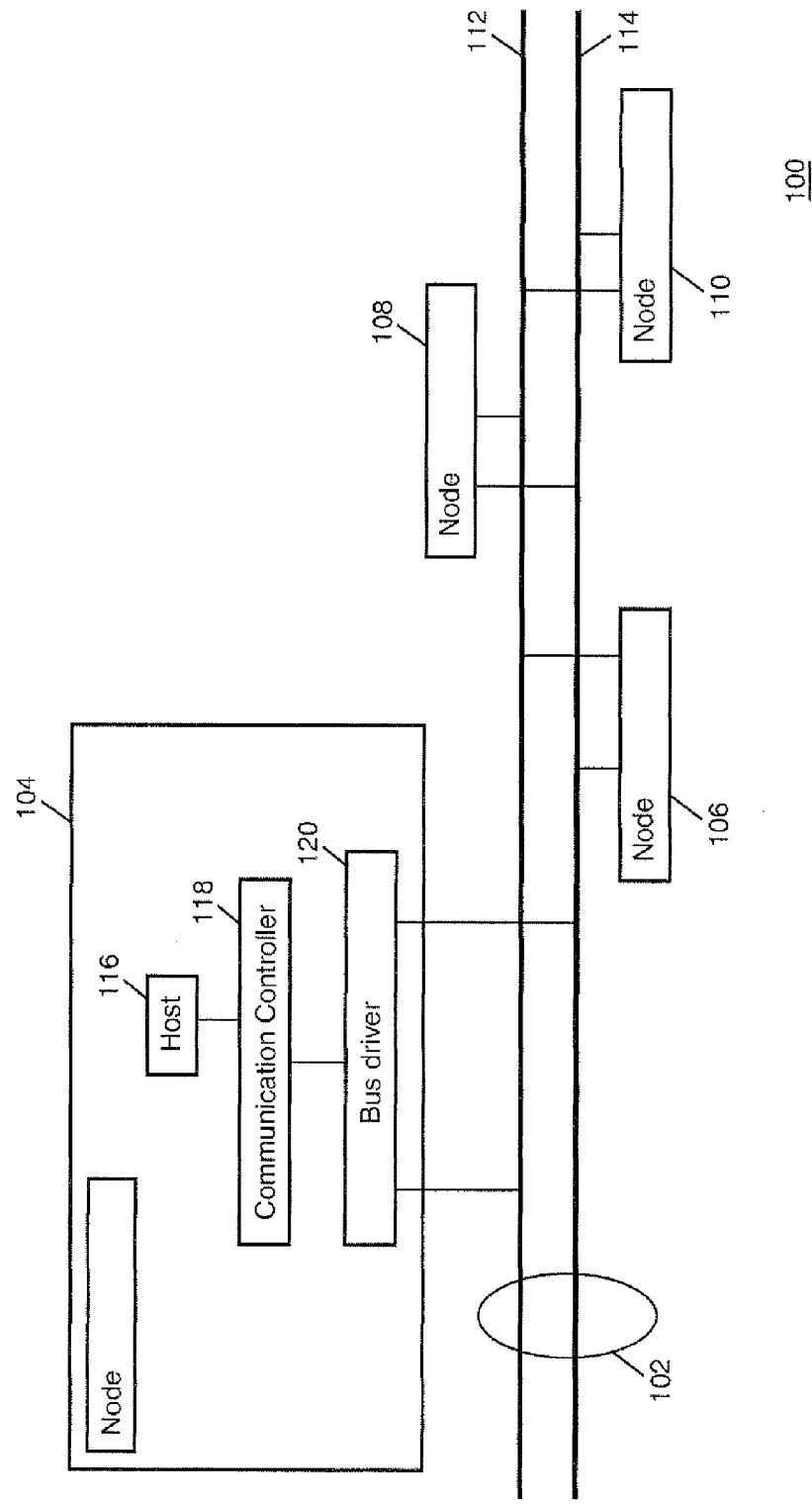
FIG. 1 is a block diagram of an example of a system wherein data processing nodes are interconnected via a bus.
Figure 2:
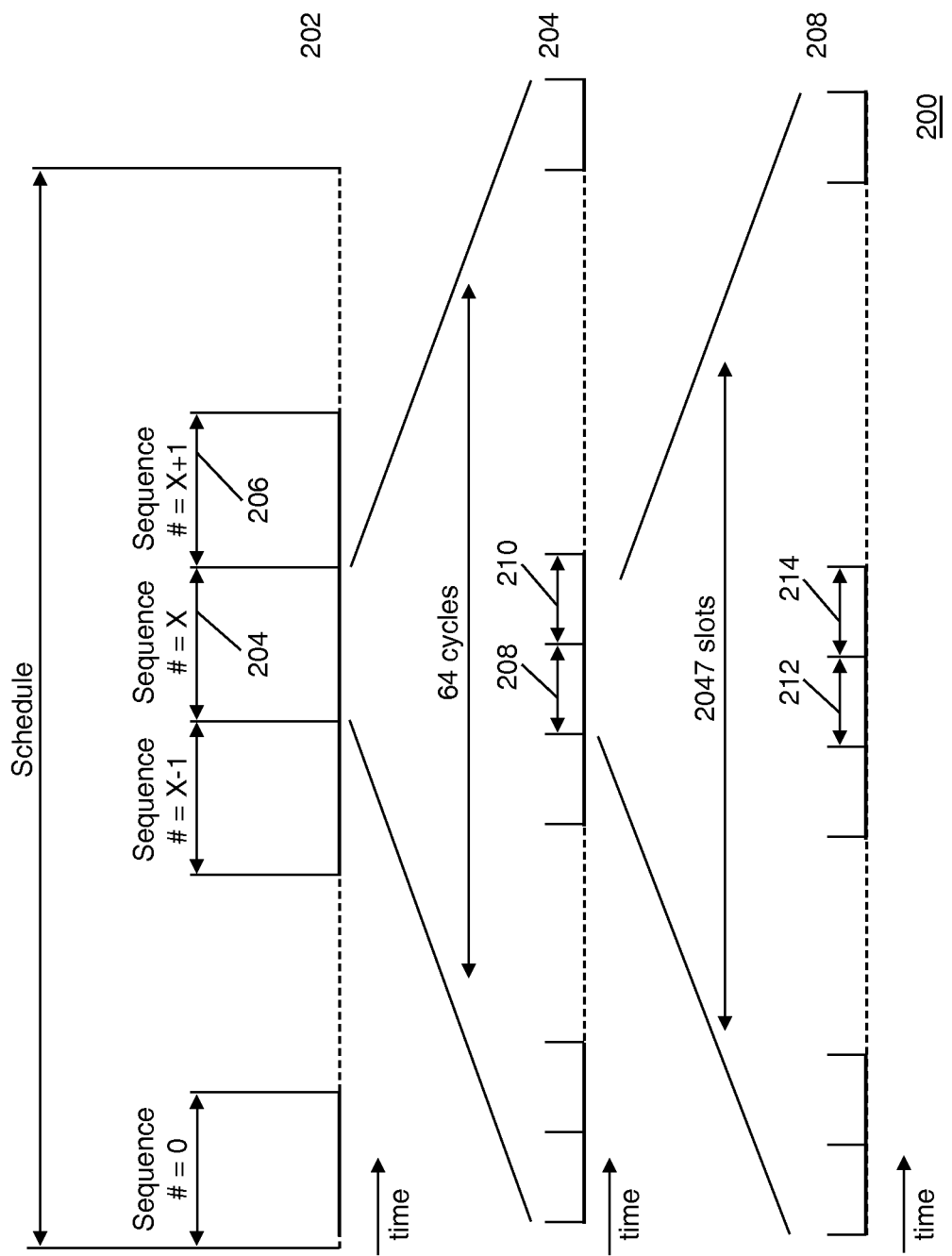
FIGS. 2 and 3 are diagrams illustrating aspects of the FlexRay protocol.
Figure 3:
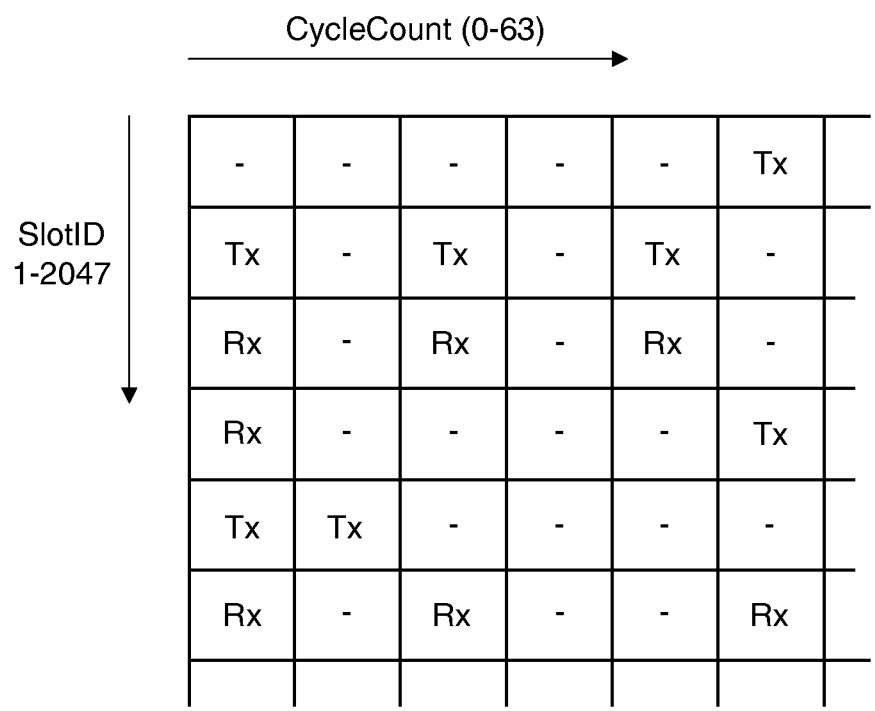

As mentioned above, the invention relates to a data processing system comprises multiple data processing nodes that communicate with one another using the FlexRay protocol. Each respective node works according to a respective schedule based on a repetitive sequence of cycles, each cycle having a sequence of time slots. Each node executes instructions, one per time slot, if any. The instructions are stored in a memory. Each instruction is identified by the relevant cycle number and time slot number in the relevant cycle. Accordingly, the combination of cycle number and slot number identify a memory address. Typical instructions appear more than once in the repetitive sequence of cycles for a node. This temporal pattern of occurrences of the same instruction at a node is used to modify the generation of the memory addresses, so that the same memory address is generated each time the instruction is needed. This saves storage space.

The proposed mechanism of the invention for storing the entries of a matrix with a regular row-/column pattern solves the issue of high memory usage while allowing deterministic reading. In addition, the compressed matrix can be easily integrated into an application. For FlexRay, it uses the repetitive behavior of the slots and cycles to optimize the communication matrix by means of reducing duplicate entries. The invention reduces the occurrence of duplicates significantly, and still allows a flexible specification of cycles. It is assumed that "typical slots" do not use or require the full 64-cycle before being repeated, but re-occur at higher repetition rates (e.g., once per 1, 2, 4, or 8 cycles). The optimization is achieved by specifying a maximum repetition count and/or sub-range of cycles on a per-slot basis. This specification is used to convert the original cycle counter (originally running from 0 to 63) into a "reduced cycle counter" and this, in turn, reduces the number of entries in the matrix for a specific slot from 64 to the number of values of the "reduced cycle counter". As the number of values of the "reduced cycle counter" is known in advance, and as the values form an ordered arrangement (e.g., 0 to 63 reduced to: 0 to 7) it is possible to use the reduced value as an index and obtain the required deterministic timing.

The modified repetition pattern can be specified in various ways. Some examples are the following.

A first example uses a 3-bit value to specify the repetition rate. The repetition rate is $2^n$, wherein n is an integer selected from the set (0, 1, 2, 3, 4, 5, and 6). Accordingly, 7 different repetition rates are feasible. The repetition rates can therefore be indicated by a 3-bit value. If the repetition rate is $2^0$, the activity for this slot occurs in each cycle. If the repetition rate is $2^6$, the activity occurs once every 64 cycles. The reduced cycle counter can then be implemented as the original cycle counter module that returns to its start value when the cycle of the specified repetition rate is reached.

A second example uses a 6-bit mask to specify which bits of the original cycle counter are for use as reduced cycle counter. This offers the same advantage as the first example but, in addition, allows for more obscure patterns (e.g., only bit 0 and bit 3 of the cycle count are being used) to be implemented.

A third example uses a 12-bit mask, 2-bits being used for each individual bit of the 6-bit cycle counter. This 2-bit value specifies if a bit of the cycle counter has to be "0", "1", "any value" or is to be used as index. All values of the cycle counter not matching the specified 0's, or 1's will be handled in an ELSE entry, i.e., one value of the reduced cycle counter is reserved as ELSE. The FlexRay protocol requires that for "transmit slots" in the static segment in each cycle a transmission is performed (either data or a null frame, see protocol spec.). This requirement is met by having an ELSE entry.

A fourth example uses a 13-bit mask, consisting of the 12-bit mask (as in the third example), but with an additional bit for specifying whether or not the ELSE clause is present.

A major advantage of the 12-bit and 3-bit implementations is that these allow sub-ranges as well. Although they take more bits to encode, it seems that the flexibility results in fewer duplicates (or empty) values in the matrix. Based on a use case and expected usage the 13-bit solution appears to be an attractive implementation.

Above examples thus specify various implementations of the transformation for modifying the cycle identifications in order to generate the memory addresses.

Figure 4:
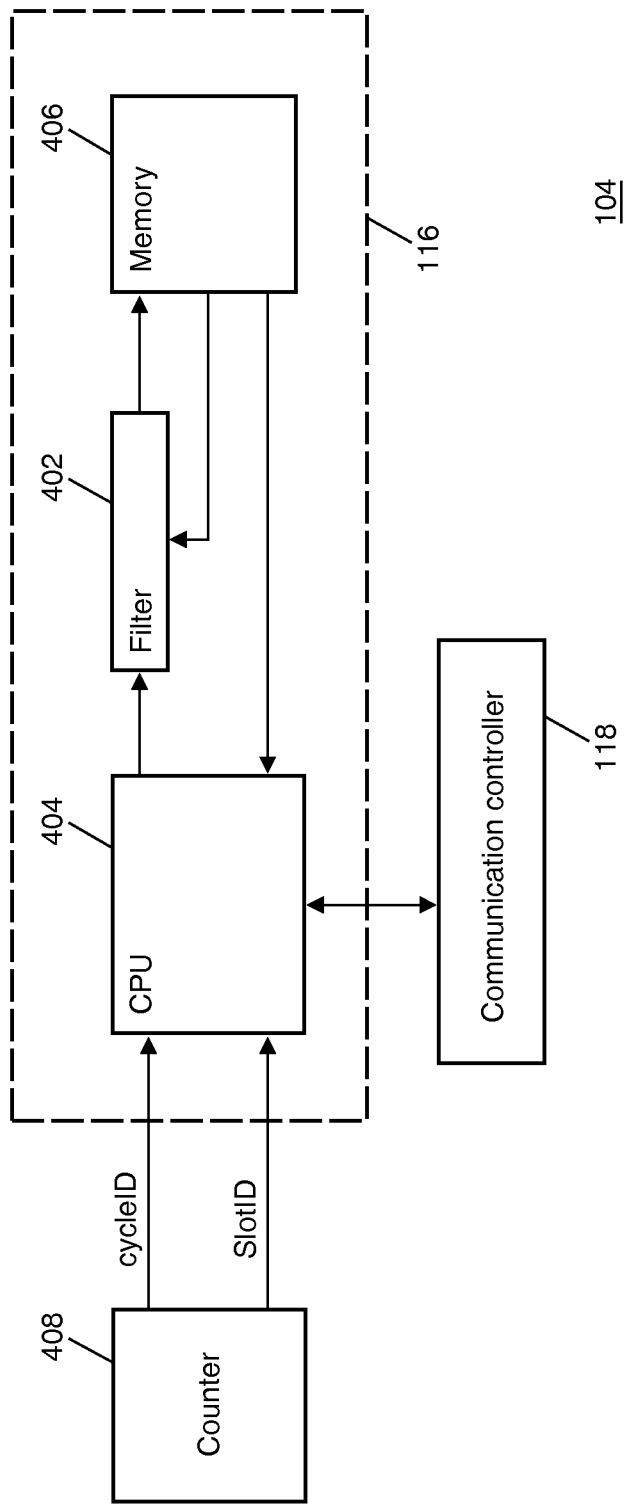
FIG. 4 is a block diagram of a node for use in the system of the invention.

FIG. 4 is a block diagram of components of a node 104 of the invention. The time basis for scheduling the operations is shared by nodes 104-110 and is expressed in terms of slotIDs and cycleIDs. Per slotID and per cycleID, an operation can be specified for node 104, thus forming a schedule for this node. After a maximum number of cycles, e.g., 64 cycles in FlexRay, the schedule is repeated. The schedule is stored in a memory, and requires that for all cycles the slots wherein the node is active an operation be specified in the schedule. This requires substantive storage capacity. The inventors have recognized that for a typical node the same operation has a higher repetition rate than the maximum number of cycles. This is now used to reduce the storage capacity needed. For a node whose schedule has operations with a higher repetition rate than the maximum number of cycles, the inventors proceed as follows.

In the example shown, the functionality added by the invention is accommodated in host 116. In other examples, the functionality is accommodated in an additional component external to host 116 and communicating with host 116, or is accommodated in or at communication controller 118. In the current example, the functionality of the invention comprises a filter 402, a data processing unit 404 and a memory 406. Unit 404 and memory 406 are, e.g., also used by host in other data processing tasks. Upon receipt by CPU 404 of timing information in terms of a specific cycleID and a specific slotID from a counter 408, filter 402 determines the specific address of the location in memory 406 where the information is stored that specifies the relevant operation to be carried out by this particular node. Execution of the operation can be in this specific time slot or a succeeding one. Unit 404 retrieves the information from memory 406. This information determines then what operation is carried out, e.g., the transmission or receipt of data via controller 118, etc. Also, the information currently retrieved from the memory location specifies how filter 402 is to process the next slotID and/or next cycleID so as to determine the next address (if any) for unit 404 to access memory 406. Accordingly, in this example, filter 402 is programmed in each slot for the event of the next slot. Memory 406 has been drawn as being part of host 116. This configuration supports a modular architecture of system 100. As mentioned before, memory 406 can, alternatively, be a memory external to host 116 and/or shared by two or more of nodes 104-110. Filter 402 has been drawn as a separate entity in the drawing. However, filter 402 can also be a part of CPU 404 that is programmable under control of memory 406.

In a first embodiment of filter 402, the cycleID is transformed, using the 3-bit indication of the repetition rate, via filter 402 and per slotID into a smaller value representative of the repetition rate for the current slotID.

In a second embodiment of filter 402, a mask is used to select the specific ones of the bits constituting the cycleID received. For example, in Flexray a 6-bit mask can be used for selecting e.g., the most-significant bit and the third bit of the cycleID as delivered by counter 408.

In a third embodiment of filter 402, a larger mask is used having 2 bits for each bit of cycleID as received from counter 408. The two mask-bits indicate if the associated bit of the counter is to be a logic zero or a logic one, or should be ignored (a so-called "don't care"), or is to be used as part of the transformed counter value. In FlexRay the mask has 12 bits. All bit values of the cycleID that do not match the prescribed logic zero or logic one, are handled in an ELSE entry, i.e. one value is reserved as a logic ELSE. The FlexRay protocol requires that for transmit slots in the static segment in each cycle a transmission be carried out (either data or a null frame, see the protocol specification of FlexRay). This requirement is met by having an ELSE entry.

In a fourth embodiment of filter 402, the mask of the third embodiment is extended by a single bit in order to indicate whether or not the ELSE clause is present. In FlexRay, the mask consists then of 13 bits.

A major advantage of the masks according to the third and fourth embodiments (12/13-bit masks in FlexRay) is that they allow for sub-ranges as well. Although these masks take more bits to encode, it has appeared that the flexibility results in fewer duplicates (or empty) values in the matrix.

The invention claimed is:
1. A data processing system comprising multiple data processing nodes operative to communicate with one another, wherein:
 each respective one of the multiple nodes is operative under control of a respective one of multiple schedules;
 the respective schedule specifies, for a repetitive temporal sequence of a first number of cycles and for a further temporal sequence of a second number of time slots per specific one of the cycles, information about a particular one of a respective plurality of operations to be executed by the respective node in a particular one of the time slots;
 the system has an address generator configured to generate for the respective node a respective address of a memory based on an identity of the current cycle and from a further identity of the current time slot for retrieval from the memory of the information about a respective relevant one of the operations to be executed;
 a specific one of the schedules specifies that a specific one of the operations is to be executed in a first particular one and a second particular one of the cycles per temporal sequence of the first number of cycles; and
 the address generator is operative to generate the memory address for retrieval of the information about the specific operation by subjecting the identities of the first and second particular cycles to a specific transformation so as to generate the same memory address storing the information.
2. The system of claim 1 wherein the specific operation is executed in the current time slot.

3. The system of claim 1 wherein the specific operation is executed in a particular time slot occurring in the current cycle after the current time slot.

4. The system of claim 1, wherein the memory stores further information about the transformation at another memory address determined by the identity of another time slot preceding the current time slot.

5. The system of claim 1, operating according to the FlexRay protocol.

6. The system of claim 1, wherein: the generator comprises multiple address generators; and each respective one of the address generators is accommodated at a respective one of the data processing nodes.

7. A data processing node for use in a data processing system comprising multiple data processing nodes operative to communicate with one another, wherein:
   each respective one of the multiple nodes is operative under control of a respective one of multiple schedules;
   the respective schedule specifies, for a repetitive temporal sequence of a first number of cycles and for a further temporal sequence of a second number of time slots per specific one of the cycles, information about a particular one of a respective plurality of operations to be executed by the respective node in a particular one of the time slots;
   the data processing node has a memory and an address generator for generating for the node an address of the memory based on an identity of the current cycle and from a further identity of the current time slot for retrieval from the memory of the information about a relevant one of the operations to be executed;
   the schedules for the node specifies that a specific one of the operations is to be executed in a first particular one and a second particular one of the cycles per temporal sequence of the first number of cycles; and
   the address generator is operative to generate the memory address for retrieval of the information about the specific operation by subjecting the identities of the first and second particular cycles to a specific transformation so as to generate the same memory address storing the information.

8. The node of claim 7, operating according to the FlexRay protocol.

9. A data processing node for use in a data processing system comprising multiple data processing nodes operative to communicate with one another, the data processing node comprising:
   a filter configured to receive a cycle identifier and slot identifier from a counter and generate a reduced cycle counter;
   a memory configured to store a schedule specifying, for a repetitive temporal sequence of a first number of cycles and for a further temporal sequence of a second number of time slots per specific one of the cycles, information about a particular one of a respective plurality of operations to be executed by the data processing node in a particular one of the time slots, wherein the memory is configured to return the information about a particular one of a respective plurality of operations based on the reduced cycle counter.

10. The data processing node of claim 9, wherein the filter generates the reduced cycle counter based on a repetition rate applicable to the information.

11. The data processing node of claim 9, wherein the cycle identifier comprises a plurality of bits and the filter generates the reduced cycle counter based on a bit mask applied to the plurality of bits.

12. The data processing node of claim 11, wherein the bit mask comprises a single bit for each of the plurality of bits of the cycle identifier.

13. The data processing node of claim 11, wherein the bit mask comprises at least two bits for each of the plurality of bits of the cycle identifier.

14. The data processing node of claim 13, wherein the bit mask further comprises a bit indicating whether an alternative reduced cycle counter is available.

15. The data processing node of claim 9, wherein the memory is configured to return information regarding how to determine the next reduced cycle counter to the filter.

16. The data processing node of claim 9, wherein the cycle identifier and slot identifier correspond to an address of the memory and the reduced cycle counter and slot identifier correspond to a modified address of the memory.

* * * * *